US012615466B2

(12) United States Patent
Rusconi Clerici Beltrami et al.

(10) Patent No.: US 12,615,466 B2
(45) **Date of Patent: *Apr. 28, 2026**

(54) ACOUSTIC TRANSDUCER UNIT

(71) Applicant: USOUND GMBH, Graz (AT)

(72) Inventors: Andrea Rusconi Clerici Beltrami, Vienna (AT); Ferruccio Bottoni, Graz (AT); Jakob Spoetl, Vienna (AT); Christian Novotny, Vienna (AT)

(73) Assignee: USOUND GMBH, Graz (AT)

( * ) Notice: Subject to any disclaimer, the term of this patent is extended or adjusted under 35 U.S.C. 154(b) by 119 days.

This patent is subject to a terminal disclaimer.

(21) Appl. No.: 18/526,287

(22) Filed: Dec. 1, 2023

(65) Prior Publication Data

US 2024/0187774 A1 Jun. 6, 2024

(30) Foreign Application Priority Data

Dec. 2, 2022 (DE) ..................... 10 2022 132 092.8
Dec. 23, 2022 (DE) ..................... 10 2022 134 731.1
Feb. 17, 2023 (DE) ..................... 10 2023 104 023.5

(51) Int. Cl.

| | |
|---|---|
| ***H04R 1/10*** | (2026.01) |
| ***H04R 1/24*** | (2006.01) |
| ***H04R 1/34*** | (2006.01) |
| ***H04R 7/12*** | (2006.01) |
| ***H04R 7/16*** | (2006.01) |
| ***H04R 9/02*** | (2006.01) |
| ***H04R 9/06*** | (2006.01) |
| ***H04R 17/00*** | (2006.01) |
| ***H04R 19/00*** | (2006.01) |

(52) U.S. Cl.
CPC ........... *H04R 1/1016* (2013.01); *H04R 17/00* (2013.01); *H04R 2201/003* (2013.01)

(58) Field of Classification Search
None
See application file for complete search history.

(56) References Cited

U.S. PATENT DOCUMENTS 5,548,657 A 8/1996 Fincham
6,269,168 B1 7/2001 Tagami
9,210,489 B1 12/2015 Chu et al.
(Continued)

FOREIGN PATENT DOCUMENTS

CN 201781608 U 3/2011
DE 19843731 A1 4/2000
(Continued)

*Primary Examiner* — Qin Zhu
(74) *Attorney, Agent, or Firm* — Maynard Nexsen PC; John P. Zimmer

(57) ABSTRACT

The invention relates to an acoustic transducer unit (1), in particular for in-ear headphones, having an electrodynamic acoustic transducer (2) comprising a first membrane (10), preferably with a membrane perforation (42), and having at least one MEMS acoustic transducer (3) comprising a second membrane (30). According to the invention, the acoustic transducer unit (1) comprises a circuit board (58) adapted such that a first rear volume of the electrodynamic acoustic transducer (2) is open and/or closes a second rear volume of the MEMS acoustic transducer (3). The invention further relates to an electronic component and to the use of an acoustic transducer unit.

19 Claims, 8 Drawing Sheets

(56) References Cited

U.S. PATENT DOCUMENTS

| | | | |
|---|---|---|---|
| 11,146,874 B2 | 10/2021 | Bottoni et al. | |
| 11,303,993 B2 | 4/2022 | Rusconi Clerici Beltrami et al. | |
| 2003/0103641 A1 | 6/2003 | Marten | |
| 2011/0228966 A1 | 9/2011 | Varla et al. | |
| 2020/0196067 A1* | 6/2020 | Rusconi Clerici Beltrami ........... | H04R 1/24 |
| 2021/0092509 A1* | 3/2021 | Rusconi Clerici Beltrami ........... | H04R 1/1016 |
| 2023/0412968 A1* | 12/2023 | Bretthauer ........... | H04R 23/002 |

FOREIGN PATENT DOCUMENTS

| | | |
|---|---|---|
| DE | 102019125815 A1 | 3/2021 |
| EP | 4240024 A1 | 9/2023 |
| WO | 2019034656 A1 | 2/2019 |
| WO | 2022121740 A1 | 6/2022 |

* cited by examiner

ACOUSTIC TRANSDUCER UNIT

This application claims priority under 35 U.S.C. § 119 to German Patent Application No. 102023104023.5 filed Feb. 17, 2023, German Patent Application No. 102022134731.1 filed Dec. 23, 2022, and German Patent Application No. 102022132092.8 filed Dec. 2, 2022, the contents of which are hereby incorporated by reference in their entirety.

FIELD OF INVENTION

The present invention relates to an acoustic transducer unit, in particular for in-ear headphones, having an electrodynamic acoustic transducer comprising a first membrane with a membrane perforation, and comprising at least one MEMS acoustic transducer having a second membrane.

BACKGROUND

WO 2022/121740 A1 discloses an acoustic transducer unit with an electrodynamic and a MEMS acoustic transducer.

BRIEF SUMMARY

The object of the present invention is to create a compact acoustic transducer unit from an electrodynamic and MEMS acoustic transducer.

The object is achieved by an acoustic transducer unit, an electronics unit, and by using the acoustic transducer unit according to the independent claims.

The invention proposes an acoustic transducer unit, in particular for in-ear headphones or on-ear headphones, comprising an electrodynamic acoustic transducer having a first membrane with a membrane perforation, and comprising at least one MEMS acoustic transducer having a second membrane. The acoustic transducer unit can also be used for other electronic components. An electronic component can be the already described in-ear headphones, but also a smartphone, laptop, tablet, smartwatch, etc.

The acoustic transducer unit further comprises a circuit board adapted such that a first rear volume of the electrodynamic acoustic transducer is and/or leaves open. The fact that the circuit board leaves the first rear volume open and/or that the rear volume is open in this case means that the first rear volume is connected to an environment of the acoustic transducer unit. As a result, air can for example flow between the first rear volume and the environment. The printed circuit board can for example comprise at least one opening and/or at least one circuit board feedthrough such that the first rear volume can be connected to the environment. As a result, a pressure equalization with the environment can be formed by the at least one opening and/or at least one circuit board feedthrough. Additionally or alternatively, the sound waves formed by the electrodynamic acoustic transducer can enter the environment about the acoustic transducer unit through the at least one opening and/or at least one circuit board feedthrough. This in particular improves the sound quality of the electrodynamic acoustic transducer. Additionally or alternatively, the printed circuit board is adapted such that the printed circuit board closes a second rear volume of the MEMS acoustic transducer. This can prevent the acoustic transducers from overlapping or influencing, in particular interfering with, each other in the rear volume of both acoustic transducers. The sound waves of the electrodynamic acoustic transducer can enter a region behind the circuit board, whereas the sound waves of the MEMS acoustic transducer are held back.

It is advantageous if the circuit board is arranged on a side of the acoustic transducer unit facing away from the first and/or second membrane. The circuit board is thus arranged on a rear side and/or a bottom side of the acoustic transducer unit. The membrane is in this case arranged on the front side and/or an upper side of the acoustic transducer unit.

It is expedient if the circuit board comprises at least one circuit board feedthrough arranged in the region of the first rear volume such that the first rear volume is open. The at least one circuit board feedthrough can thus leave the first rear volume open. The at least one circuit board feedthrough then forms the connection between the first rear volume and the environment.

It is advantageous if the printed circuit board comprises at least one connection. Electrical signals and/or a power supply can be routed to the acoustic transducer unit over the at least one connection. The at least one connection can be adapted as a flexible connection section. The connection can for example be adapted as a flex PCB. The connection can then be rotated such that the connection can be formed from different directions. Additionally or alternatively, the at least one connection can also be adapted as a plug. A plug and a flexible connection section can for example also be arranged. An electrical power supply can for example be provided over the plug, and the electrical signals can be routed over the flexible connection section.

The MEMS acoustic transducer is advantageously integrated into the electrodynamic acoustic transducer such that the sound waves generated by the second membrane can exit the acoustic transducer unit trough the membrane perforation. The acoustic transducer unit can thus be adapted in a compact manner. The membrane perforation permits guiding out the sound waves of the MEMS acoustic transducer such that these are only minimally disturbed and the audio quality remains high.

It is likewise advantageous if the electrodynamic acoustic transducer is arranged about the at least one MEMS acoustic transducer. The electrodynamic acoustic transducer thus surrounds the MEMS acoustic transducer. The MEMS acoustic transducer is arranged in the interior of the electrodynamic acoustic transducer such that the acoustic transducer unit is compact.

Furthermore, it is advantageous if the first membrane is annular. Sound waves with few distortions can thus be emitted with the first membrane of the electrodynamic acoustic transducer. In particular, the first membrane is shaped as a disc with a preferably round hole, in particular in the center.

It is also advantageous if the electrodynamic acoustic transducer has an annular shape. As a result, the electrodynamic acoustic transducer has a through-hole through which at least the sound waves of the MEMS acoustic transducer can be at least partially guided. The electrodynamic acoustic transducer can also have the shape of a torus.

It is also advantageous if the MEMS acoustic transducer is arranged in a through-hole of the annular electrodynamic acoustic transducer. As a result, the acoustic transducer unit is compact since the MEMS acoustic transducer is arranged in the interior of the electrodynamic acoustic transducer. The size of the acoustic transducer unit is thus pre-determined by the size of the electrodynamic acoustic transducer. If the electrodynamic acoustic transducer has the shape of a torus, the MEMS acoustic transducer can also be arranged in a through-hole of the torus. It can then also be the case that the electrodynamic acoustic transducer is shaped similar to the shape of a torus. The electrodynamic acoustic transducer can have a toroidal shape.

It is also advantageous if the acoustic transducer unit has a transducer cavity in which the MEMS acoustic transducer and/or an electronics unit is arranged. The transducer cavity can in this case be formed at least partially by the through-hole of the annular electrodynamic acoustic transducer. The transducer cavity can be arranged in the interior the electrodynamic acoustic transducer such that the acoustic transducer unit has a compact design. The transducer cavity serves as a space to accommodate the MEMS acoustic transducer and/or the electronics unit.

It is advantageous if the transducer cavity is surrounded in radial direction by a magnet unit, in particular a magnet, of the electrodynamic acoustic transducer. The magnet unit can then directly surround the transducer cavity. The magnet unit thus forms the boundary of the transducer cavity. This eliminates additional components such that the acoustic transducer unit can have a compact, low-weight design.

Additionally or alternatively, it is advantageous if the MEMS acoustic transducer and/or the electronics unit is arranged in the axial direction of the acoustic transducer unit at the height of the magnet unit, in particular the magnet. The magnet unit, in particular the magnet, thus extends in radial direction about the MEMS acoustic transducer and/or the electronics unit. The magnet unit, in particular the magnet, and the MEMS acoustic transducer and/or the electronics unit thus overlap at least partially, in particular completely, in the axial direction of the acoustic transducer unit.

It is advantageous if the MEMS acoustic transducer, the electronics unit, and/or the holder in the axial direction of the acoustic transducer unit have an overlap region with a magnet unit, in particular a magnet, of the electrodynamic acoustic transducer, of a coil of the electrodynamic acoustic transducer and/or a transducer housing of the acoustic transducer unit. The MEMS acoustic transducer and the magnet unit, in particular the magnet then for example overlap in axial direction. The magnet unit, in particular the magnet, thus surrounds the MEMS acoustic transducer, wherein both overlap in at least one section in axial direction.

It is also advantageous if the MEMS acoustic transducer is arranged on the holder of the acoustic transducer unit and/or on the magnet unit, in particular on the first pole element, of the electrodynamic acoustic transducer. Additionally or alternatively, the MEMS acoustic transducer and the holder and/or the magnet unit, in particular the first pole element, can have a contact surface. The MEMS acoustic transducer is preferably connected to the holder and/or the magnet unit, in particular the first pole element. For example, the MEMS acoustic transducer is glued together with the holder and/or the magnet unit, in particular the first pole element. The contact surface can in this case be at least partially an adhesive surface.

It is advantageous if the electronics unit has an electronics feedthrough that connects to a MEMS cavity of the MEMS acoustic transducer. The electronics feedthrough is used to allow pressure equalization to take place during the movement of the second membrane. By means of the electronics feedthrough, a connection can be established to a rear volume of the MEMS acoustic transducer or the in-ear headphones, or the rear volume can be formed.

It is furthermore advantageous if a sound propagation axis of the electrodynamic acoustic transducer and a sound propagation axis of the MEMS acoustic transducer are arranged coaxially in relation to one another, in particular in the axial direction of the acoustic transducer unit.

It is advantageous if the acoustic transducer unit comprises at least one microphone, by means of which at least the sound waves and/or ambient noises that can be generated by the electrodynamic acoustic transducer can be detected. Additionally or alternatively, the sound waves generated by the MEMS acoustic transducer can also be detected. By detecting the sound waves of the electrodynamic acoustic transducer and/or MEMS acoustic transducer, it is possible to monitor whether the latter functions correctly and/or whether the sound waves have high audio quality. Active noise canceling can be carried out if the ambient noise is recorded additionally or alternatively. An anti-sound is generated that cancels and thus suppresses the ambient noise. The anti-sound can in this case be generated by the electrodynamic acoustic transducer and/or by the MEMS acoustic transducer after detection.

The invention also proposes an acoustic transducer unit, in particular for in-ear headphones, with an electrodynamic acoustic transducer having a first membrane, and with at least one MEMS acoustic transducer having a second membrane. The acoustic transducer unit can have at least one feature of the preceding and/or subsequent description.

The invention proposes an electronic component, in particular in-ear headphones, having an acoustic transducer unit according to the previous and/or subsequent description, wherein the mentioned features can be present individually or in any combination. The electronic component can also be a smartphone, tablet, laptop, etc.

It is advantageous if the electronic component has an outlet opening. The sound waves can exit the electronic component through the outlet opening.

The invention proposes using an acoustic transducer unit in an electronic component. The acoustic transducer unit and/or the electronic component is advantageously adapted according to the preceding description, wherein the mentioned features can be present individually or in combination.

The acoustic transducer unit can comprise a woofer, a tweeter, and an electronics unit, for example for in-ear headphones or also in-ear telephones. The woofer can have a "donut" shape, with an open space and/or a through-hole and/or the transducer cavity, preferably in the center. The MEMS tweeter is arranged in this space.

The electronics unit can be mounted directly under the tweeter and provides the necessary amplification of the audio signal for the tweeter.

At least one microphone (for active noise canceling) can be arranged as a flexboard or a PCB. The acoustic transducer unit in this case comprises the at least one microphone. The microphone can be assigned to the electrodynamic acoustic transducer such that the microphone can detect the sound waves generated by the electrodynamic acoustic transducer. This permits monitoring the sound quality. Additionally or alternatively, ambient noise can also be recorded using the microphone. From said ambient noise, an anti-sound can be formed that can be generated by the electrodynamic acoustic transducer and/or by the MEMS acoustic transducer to cancel ambient noise such that ambient noise is suppressed.

One of the typical applications with regard to electrical control is the following: The Bluetooth chip will function as an electrical audio source in TWS headphones (true wireless headphones) or the electronic component. It contains an amplifier for typical electrodynamic headphone speakers. The signal can be routed through a frequency switch to use this amplified signal for the electrodynamic woofer and to add a MEMS tweeter. The frequency switch splits the signal into low frequencies for the woofer and high frequencies for the tweeter. Low frequencies can be fed directly to the electrodynamic woofer. High frequencies are fed to the tweeter amplifier. The signal of the tweeter is amplified and used to operate the MEMS tweeter.

The additional amplification for the MEMS tweeter is required for two reasons: Firstly, the MEMS represents a different electrical load, which can lead to problems when using standard amplifiers for electrodynamic speakers. Secondly, the required voltage level for the MEMS tweeter is approximately ten times higher than for the electrodynamic woofer.

The combination of the electrodynamic woofer and the MEMS tweeter is a coaxial design for in-ear headphones or a telephone application, or also for the electronic component.

A "donut-shaped" electrodynamic woofer with an integrated MEMS tweeter in the center form a coaxial speaker for in-ear headphones, in-ear telephones, or for electronic components.

An electrodynamic woofer with an annular magnet and an integrated MEMS tweeter in the center, which form a coaxial loudspeaker for in-ear headphones or a telephone application, or for electronic components.

A "donut-shaped" electrodynamic woofer with an integrated MEMS tweeter in the center, which contains a printed circuit board with control electronics and forms a coaxial loudspeaker for in-ear headphones or a telephone application, or for electronic components.

An acoustic transducer unit, comprising a "donut-shaped" electrodynamic woofer, an integrated MEMS tweeter in the center, including a printed circuit board with control electronics, and a microphone, in particular a feedback microphone, thus forming a coaxial loudspeaker for in-ear headphones or a telephone application, or for electronic components.

- Insertion of a (MEMS) tweeter in a "donut-shaped" electrodynamic woofer from the rear. Allows simple electrical connections on the rear.
- Integration of a printed circuit board with control electronics into the acoustic transducer unit of the coaxial in-ear headphones or the electronic component.
- Integration of a MEMS tweeter and a printed circuit board with electronics unit into an interior of an electrodynamic woofer.
- Installation of a (MEMS) tweeter with printed circuit board and electronics unit into an electrodynamic woofer from the rear. Allows simple electrical connections on the rear.
- Combination of an annular magnet for the electrodynamic woofer with the integration of the MEMS tweeter into the available space in the center of a loudspeaker module.
- A holder that combines 2 functions: the mounting point of the inner ring or the inner membrane support of the woofer membrane and the MEMS tweeter.
- A holder in the middle of the acoustic transducer unit that combines two functions: It holds the inner ring or the inner membrane support of the woofer mem-brane and the MEMS tweeter. It enables the sound path of the tweeter and the woofer membrane to be optimized separately. It is also an efficient method for assembly.
- A circuit that separates the tweeter signal from an already amplified full-spectrum signal.
- Use of the amplified signal for an electrodynamic speaker to create a 2-path system by using a separate amplifier for the MEMS tweeter.
- Use of a passive frequency switch for an amplified signal and feeding the signals firstly directly into a woofer and, secondly, into another dedicated amplifier for the tweeter.
- Audio module with an electrodynamic and a MEMS loudspeaker that receives an already amplified audio signal and acts as the frequency switch as well as the subsequent additional amplifier for the signal of the MEMS loudspeaker.

Further advantages of the invention are described in the following exemplary embodiments. These show in:

DETAILED DESCRIPTION

Figure 1:
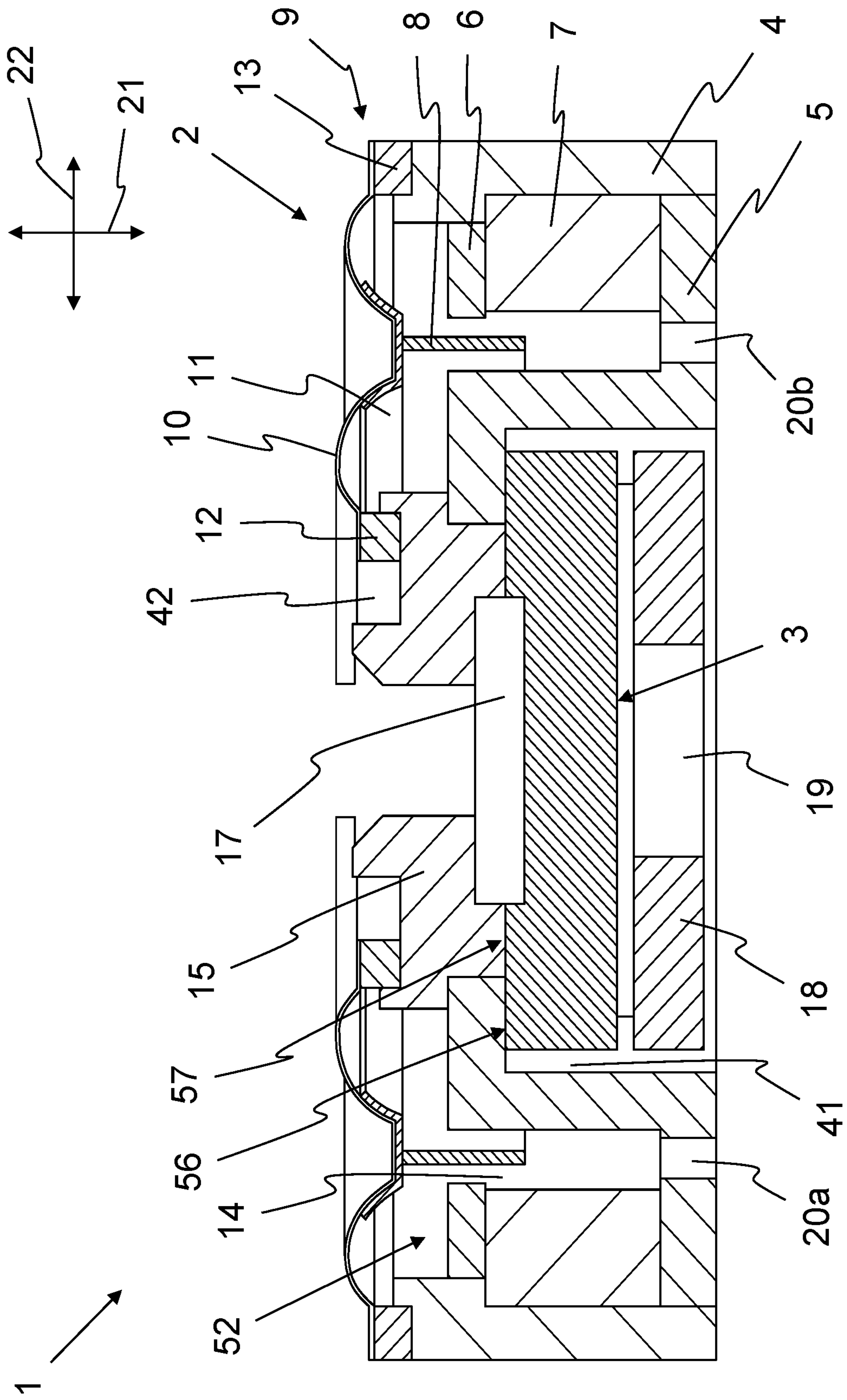
FIG. 1 a cross-section of an acoustic transducer unit with an electrodynamic and a MEMS acoustic transducer, FIG. 2 a cross-section of the MEMS acoustic transducer, FIG. 3 a cross-section of in-ear headphones with the acoustic transducer unit in a headphone housing, FIG. 4 a cross-section of the electrodynamic transducer, FIG. 5 a block diagram of at least a part of the electronics unit, FIG. 6 a cross-section of the electrodynamic acoustic transducer with the MEMS acoustic transducer, FIG. 7 a top view of a MEMS acoustic transducer, and in FIG. 8 a cross-section of an acoustic transducer unit with a circuit board.
Figure 3:
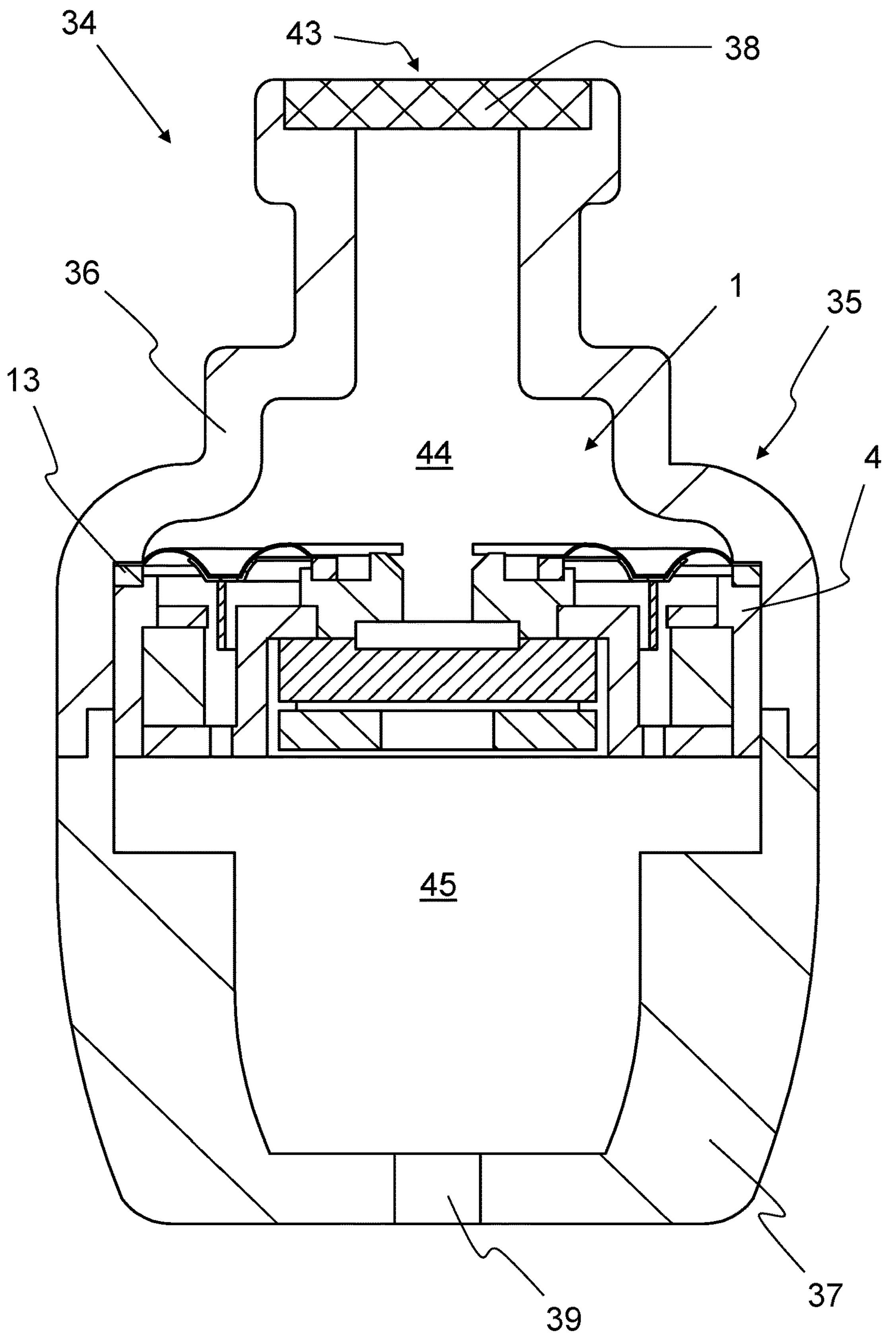

FIG. 1 shows an acoustic transducer unit 1 with an electrodynamic acoustic transducer 2 and a MEMS acoustic transducer 3. The acoustic transducer unit 1 can for example be used in in-ear headphones 34. Such in-ear headphones 34 are for example used and installed as hearing aids, for communication, for example for making phone calls, or for listening to music. The in-ear headphones 34, as shown in FIG. 3, can then at least partially be inserted into an auditory canal of an ear. The acoustic transducer unit 1 can also be used in smartphones or other electronic components. The in-ear headphone 34 shown in FIG. 3 is an example of an electronic component. The acoustic transducer unit 1 can also be used in on-ear headphones, smartphones, laptops, tablets, smartwatches, etc.

The acoustic transducer unit 1 has an axial direction 21 and a radial direction 22.

The acoustic transducer unit 1 comprises a transducer housing 4. The electrodynamic acoustic transducer 2 and/or the MEMS acoustic transducer 3 are at least partially arranged in the transducer housing 4. The electrodynamic acoustic transducer 2 can in this case also be referred to as a woofer because the electrodynamic acoustic transducer 2 or the woofer in the present acoustic transducer unit 1 is primarily provided to generate low-frequency sounds. Such low-frequency tones for example have a frequency from approx. 20 Hz to 1000 Hz. In the present acoustic transducer unit 1, the electrodynamic acoustic transducer 2 thus serves as a woofer. Conversely, the at least one MEMS acoustic transducer 3 in the present acoustic transducer unit 1 can be referred to as a tweeter. The MEMS acoustic transducer 3 generates sound in the acoustic transducer unit 1 with a frequency that is in particular higher than that of the electrodynamic acoustic transducer 2 or the woofer. For example, the MEMS acoustic transducer 3 generates sound or tones with a frequency between about 500 Hz and 20 KHz. In the present description, the electrodynamic acoustic transducer 2 can therefore also be referred to as a woofer. The MEMS acoustic transducer 3 can in the present description also be referred to as a tweeter.

Figure 2:
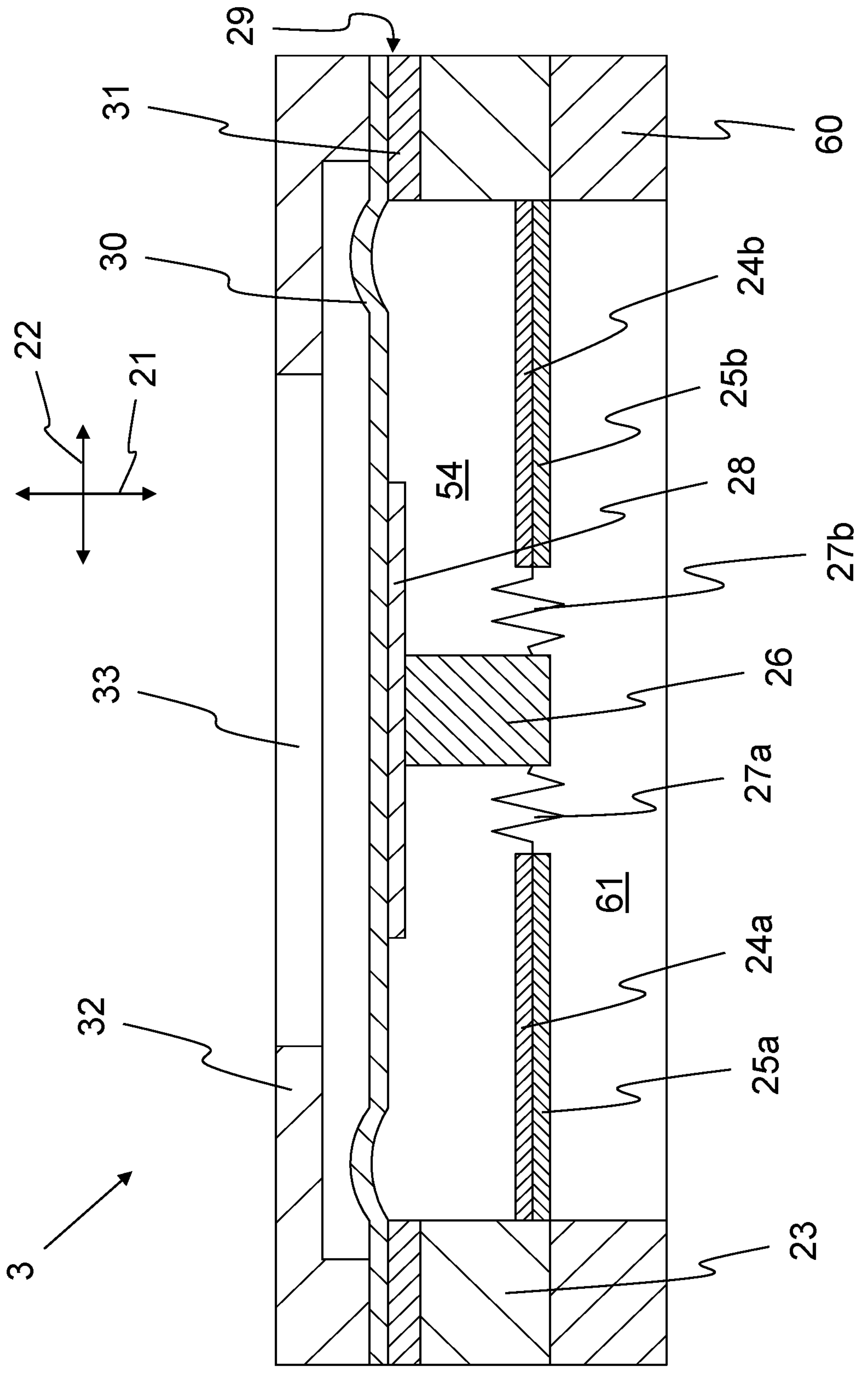

The MEMS acoustic transducer 3 is shown in more detail in FIG. 2.

The electrodynamic acoustic transducer 2 or the woofer 2 comprises at least one pole element 5, 6. According to the present exemplary embodiment, the woofer 2 comprises a first and a second pole element 5, 6. A magnet 7, which is preferably a permanent magnet, is arranged between the two pole elements 5, 6. The magnet 7 generates a magnetic field, and the two pole elements 5, 6 guide and/or bundle the magnetic flux of the magnet 7. At least the at least one pole element 5, 6 and the magnet 7 together form a magnet unit 52. The magnet unit 52, in particular the at least one pole element 5, 6 and/or the magnet 7, can be annular.

The electrodynamic and the MEMS acoustic transducers 2, 3 are arranged coaxially in relation to each other. A sound propagation direction of the electrodynamic and the MEMS acoustic transducer 2, 3 can also be coaxial in relation to one another. In the present FIG. 1, the sound of the electrodynamic and the MEMS acoustic transducer 2, 3 is emitted in axial direction 21 and upwards in this case. The corresponding sound propagation directions are thus also oriented in axial direction 21 and upwards in this case.

The two pole elements 5, 6 shown here are arranged at a distance from one another in an axial direction 21 of the acoustic transducer unit 1. Additionally or alternatively, the two pole elements 5, 6 are spaced at a distance from one another in a radial direction 22 of the acoustic transducer unit 1. A magnet gap 14 is furthermore arranged between the two pole elements 5, 6 spaced at a distance from one another in radial direction 22. Additionally or alternatively, the magnet gap 14 is arranged in radial direction 22 between the first pole element 5 and the magnet 7. A coil 8 of the woofer 2 is arranged in this magnet gap 14. The coil 8 projects into the magnet gap 14. An electrical signal is applied to the coil 8, which thus has an electrical current flowing through it. The electrical signal corresponds to the sounds generated by the electrodynamic acoustic transducer 2 or the woofer 2 when the electrodynamic acoustic transducer 2 is operated as a loudspeaker. The electrical current generated by the electrical signal in the coil 8 likewise leads to a magnetic field that cooperates with the magnetic field of the magnet 7 and/or the pole elements 5, 6. The coil 8 moves since the magnet 7 and/or the pole elements 5, 6 are fixed.

The movement of the coil 8 is transferred to a membrane unit 9, wherein the membrane unit 9 oscillates the air arranged above it according to the movement of the coil 8. The membrane unit 9 consequently generates the sound.

For sound generation, the membrane unit 9 comprises a first membrane 10, which is connected to the coil 8 by means of a coupling unit 11 such that the movement of the coil 8 can be transferred to the first membrane 10. Since the electrodynamic acoustic transducer 2 is mainly used to generate low-frequency sounds, the first membrane 10 can also be referred to as the woofer membrane. The membrane unit 9 further comprises an inner membrane carrier 12 and an outer membrane carrier 13. The inner membrane carrier 12 is arranged in the interior in radial direction 22 and the outer membrane carrier 13 is arranged on the exterior in radial direction 22. The first membrane 10 is mounted between the two membrane carriers 12, 13. The first membrane 10 and/or the membrane unit 9 thus has the shape of a perforated disc. The membrane unit 9 and/or the first membrane 10 comprises a membrane perforation 42 arranged in a central region, in particular the center, of the first membrane 10 and/or the membrane unit 9. Furthermore, the inner membrane carrier 12 surrounds the membrane perforation 42. The inner and/or the outer membrane carrier 12, 13 can be annular. As a result, the first membrane 10 has a round shape with a round hole in a central region. The outer membrane carrier 13 is arranged on the transducer housing 4. The inner membrane carrier 12 is arranged on the holder 15. The first membrane 10 or the membrane unit 9 can be annular.

The acoustic transducer unit 1 further comprises a transducer cavity 41, in which the MEMS acoustic transducer 3 is arranged. The woofer 2 can also comprise the transducer cavity 41. The transducer cavity 41 is shown better in FIG. 4 since the latter omits the MEMS acoustic transducer 3. The woofer 2 thus extends around the MEMS acoustic transducer 3. The MEMS acoustic transducer 3 is arranged within the electrodynamic acoustic transducer 2. The MEMS acoustic transducer 3 is arranged in the center of the electrodynamic acoustic transducer 2. The electrodynamic acoustic transducer 2 surrounds the MEMS acoustic transducer 3. This achieves a very compact design of the acoustic transducer unit 1.

According to the present exemplary embodiment, the first pole element 5 and/or the magnet 7 or the magnet unit 52 surrounds the transducer cavity 41. The transducer cavity 41 is arranged within the first pole element 5 and/or the magnet 7 or the magnet unit 52.

According to the present exemplary embodiment, at least the MEMS acoustic transducer 3 and the magnet unit 52, in particular the magnet 7 and/or the first pole element 5, are arranged at the same height in axial direction 21 of the acoustic transducer unit 1. The MEMS acoustic transducer 3 and the magnet unit 52, in particular the magnet 7, have an overlapping region in axial direction 21. The MEMS acoustic transducer 3 and the magnet unit 52, in particular the magnet 7, thus overlap in axial direction 21.

As shown further in FIG. 1, the MEMS acoustic transducer 3 and the electrodynamic acoustic transducer 2 are arranged coaxially in relation to one another. The electrodynamic acoustic transducer 2 is arranged in radial direction 22 around the MEMS acoustic transducer 2.

The electrodynamic acoustic transducer 2, in particular the magnet unit 52, furthermore has the shape of a torus or is similar to a torus. Alternatively, the electrodynamic acoustic transducer 2, in particular the magnet unit 52, has an annular shape. The electrodynamic acoustic transducer 2 forms an outer layer of the acoustic transducer unit 1 and the MEMS acoustic transducer 3 forms a core. The electrodynamic transducer 2 has the shape of a donut. The membrane perforation 42 and/or the transducer cavity 41 and/or the sound cavity 17 explained below form the opening or the through-hole of the torus or donut or the electrodynamic acoustic transducer 2. The membrane perforation 42 is shown better in FIG. 4. Because it influences the sound quality, the sound cavity 17 is preferably formed as small as possible or omitted.

The acoustic transducer unit 1 further comprises a holder 15. According to the present exemplary embodiment, the holder 15 is arranged, or rests, on the first pole element 5 or on the magnet unit 52. The inner membrane carrier 12 is furthermore arranged on the holder 15. The holder 15 thus connects the inner membrane carrier 12 to the first pole element 5. The holder 15 supports the inner membrane carrier 12. The MEMS acoustic transducer 3 is furthermore at least partially arranged on the inner membrane carrier 12 and/or on the first pole element 5. The MEMS acoustic transducer 3, the first pole element 5 and/or the inner membrane carrier 12 can be arranged on the holder 15. The holder 15 is preferably made of plastic.

However, the woofer 2 and the tweeter 3 are preferably coaxial in relation to one another.

Furthermore, a sound cavity 17 can be provided. The latter can also at least partially form a front volume of the tweeter 3.

The acoustic transducer unit 1 further comprises an electronics unit 18, by means of which the acoustic transducer unit 1 can be operated. The electronics unit 18 can comprise a Bluetooth chip 49 to feed audio signals, by means of which the sound is generated. However, the Bluetooth chip 49 can also be arranged outside the electronics unit 18, for example in an external unit. The electronics unit 18 can further comprise a frequency switch 50. The latter is in particular connected to the Bluetooth chip 49 and splits the audio signal into a first signal part for the electrodynamic acoustic transducer 2 and a second signal part for the MEMS acoustic transducer 3. The frequency switch 50 can also duplicate the audio signal, namely into the first and the second signal part. The first signal part is fed to the woofer 2 and can in particular be such that it does not have to be amplified. For this purpose, a first amplifier 48 can be provided, which is part of the electronics unit 18 or which, like the Bluetooth chip 49, is arranged outside of the electronics unit 18, for example in an external unit. In particular, the first amplifier 48 can supply the electronics unit 18 with an already amplified signal that can be fed to the electrodynamic acoustic transducer 2, in particular after passing the frequency switch 50. A further amplification of the signal for the electrodynamic acoustic transducer 2 can thus be omitted, therefore allowing the electronics unit 18 to have a very small design.

Figure 5:
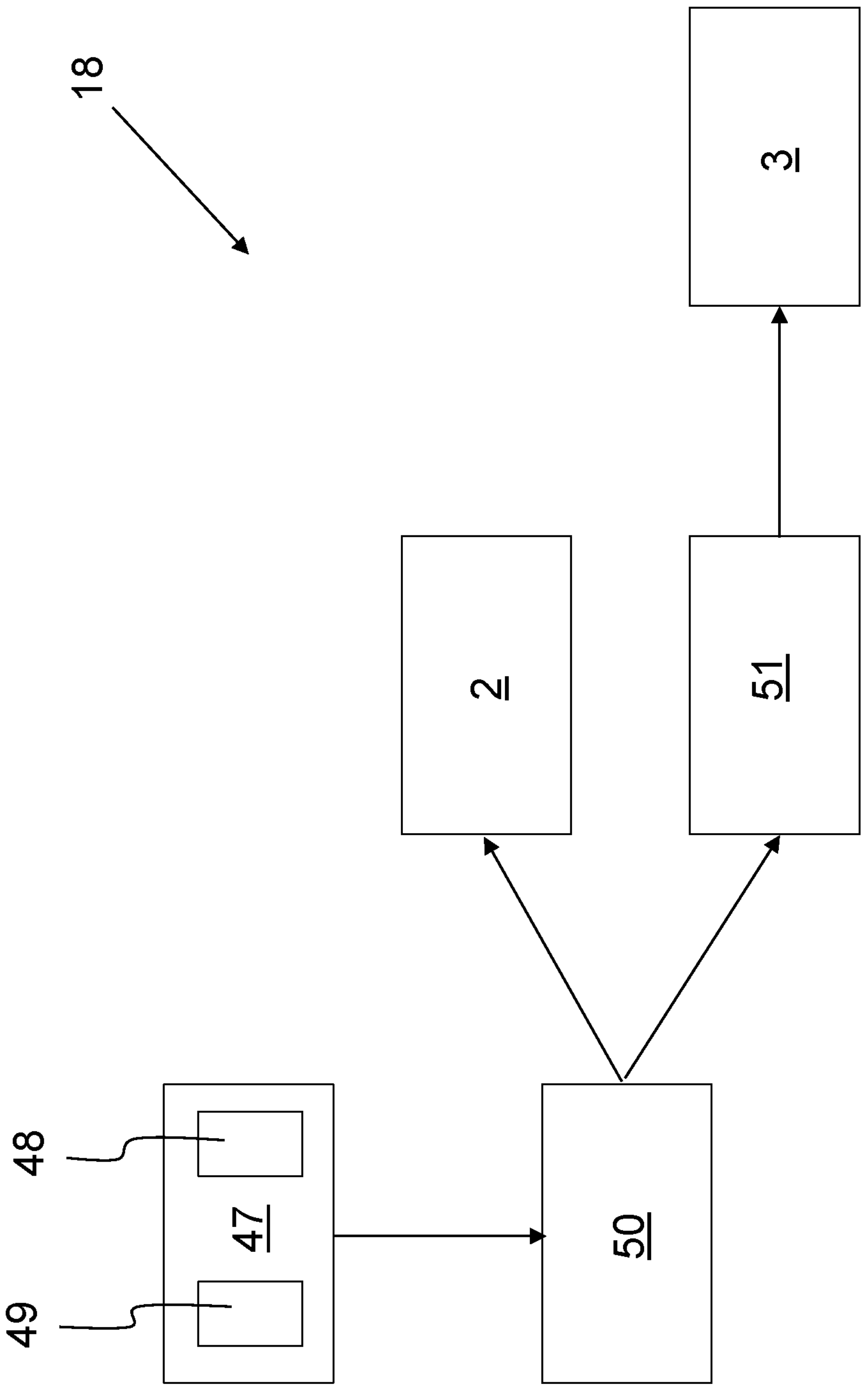

The electronics unit 18 can comprise a second amplifier 51, namely a tweeter amplifier or MEMS amplifier, by means of which the second signal part for the tweeter 3 is amplified. The signal amplified by the second amplifier 51 is then fed to the tweeter 3. A block diagram of at least a part of the electronics unit 18 is shown in FIG. 5.

The electronics unit 18 preferably comprises an electronics feedthrough 19, which at least partially forms a rear volume of the tweeter 3. In addition, a pressure equalization can take place.

In order to achieve pressure equalization, the first pole element 5 can additionally or alternatively comprise at least one pole feedthrough 20, which can be adapted as a hole or bore. Several pole feedthroughs 20*a*, 20*b* are shown here.

As can be seen here, the acoustic transducer unit 1 is adapted to be rotationally symmetrical. In particular the electrodynamic acoustic transducer 2, in particular the magnet unit 52, the magnet 7, the first and/or second pole element 5, 6, the coil 8, the membrane unit 9, the first membrane 10 and/or the inner and/or the outer membrane carrier 12, 13 are round and/or rotationally symmetric. Additionally or alternatively, the holder 15 is round and/or rotationally symmetric. Additionally or alternatively, the coupling unit 11 is round and/or rotationally symmetric. Additionally or alternatively, the transducer housing 4 is round and/or rotationally symmetric.

Furthermore, as can be seen here, a first contact surface 56 is arranged and/or formed between the MEMS acoustic transducer 3 and the magnet unit 52, in particular the first pole element 5. The MEMS acoustic transducer 3 is thus arranged on the magnet unit 52, in particular on the first pole element 5. Additionally or alternatively, a second contact surface 57 can be arranged and/or formed between the MEMS acoustic transducer 3 and the holder 15. The MEMS acoustic transducer 3 is thus arranged on the holder 15.

The MEMS acoustic transducer 3 can be connected to the magnet unit 52, in particular the first pole element 5, and/or the holder 15, by means of the first and/or second contact surface 56, 57. The first and/or second contact surface 56, 57 can, for example, be an adhesive surface such that the MEMS acoustic transducer 3 is glued to the magnet unit 52, in particular to the first pole element 5, and/or to the holder 15.

Furthermore, the MEMS acoustic transducer 3 rests on a side facing away from the first membrane 10 on the holder 15 and/or on the magnet unit 52, in particular on the first pole element 5. The first membrane 10 is thus arranged on the one side and the MEMS acoustic transducer 3 on the other side of the holder 15 and/or the magnet unit 52, in particular the first pole element 5.

For the sake of simplicity, features that are already described in the at least one preceding figure cannot be explained again. Furthermore, features can also only be described in said figure or in at least one of the following figures. Furthermore, the same reference symbols are for the sake of simplicity used for the same features. In addition, for the sake of clarity, not all features in subsequent figures can be shown and/or provided with a reference symbol. However, features shown in one or more of the preceding figures can also be present in said figure or in one or more of the subsequent figures. Furthermore, for the sake of clarity, features can also only be shown and/or provided with a reference symbol in said figure or in one or more of the subsequent figures. Nonetheless, features that are only shown in one or more of the subsequent figures can already be present in said figure or a preceding figure.

FIG. 2 shows a cross-section of the MEMS acoustic transducer 3. The tweeter 3 comprises a carrier substrate 23 and at least one carrier layer 24 arranged thereon. At least one piezo layer 25 is arranged on the carrier substrate 23 and/or on the at least one carrier layer 24. The tweeter 3 in this case comprises two carrier layers 24*a*, 24*b* and two piezo layers 25*a*, 25*b*. The at least one carrier layer 24 and the at least one piezo layer 25 are arranged one above the other in axial direction 21.

The at least one piezo layer 25 is deflects according to the applied electrical signal, as a result of which the air is oscillated and the sound is thus generated.

The tweeter 3 further comprises a coupling element 26, which is connected to the at least one piezo layer 25 and/or the carrier layer 24 by at least one spring element 27. The coupling element 26 can transfer the deflection of the at least one piezo layer 25 to a MEMS membrane unit 29. A coupling plate 28 is arranged between the coupling element 26 and the MEMS membrane unit 29 such that the deflection transmitted by the coupling element 26 is transferred to the MEMS membrane unit 29 in a planar manner.

The MEMS membrane unit 29 comprises at least one second membrane 30 that can oscillate the air such that the sound is generated according to the deflection of the at least one piezo layer 25. Furthermore, the MEMS membrane unit 29 can comprise a MEMS membrane frame 31 on which the second membrane 30 is arranged. The MEMS membrane frame 31 can also be round or angular.

The MEMS acoustic transducer 3 can further comprise a cover 32 arranged on the MEMS membrane unit 29 and/or on the carrier substrate 23. The cover 32 forms a cap for the tweeter 3. The cover 32 comprises a cover feedthrough 33 such that the sound generated can exit. The cover feedthrough 33 can likewise at least partially, in particular completely, form the front volume of the tweeter 3.

The MEMS acoustic transducer 3 further comprises a MEMS cavity 54. As shown in FIG. 1, the electronics feedthrough 19 connects to the MEMS cavity 54 when the MEMS acoustic transducer 3 is arranged in the acoustic transducer unit 1. As can be seen in FIG. 3, the MEMS cavity 54 thus has contact with the closure part cavity 45. As a result, the electronics feedthrough 19 and/or the closure part cavity 45 forms a rear volume of the MEMS acoustic transducer 3.

The MEMS acoustic transducer 3 further comprises a MEMS printed circuit board 60. This MEMS printed circuit board 60 is assigned to the MEMS acoustic transducer 3. The MEMS printed circuit board 60 can for example feed electrical signals to the piezo layers 24, or the electrical signals can be distributed by means of the MEMS printed circuit board 60. The MEMS circuit board 60 also has a circuit board cavity 61, which can at least partially form a rear volume of the MEMS acoustic transducer 3. The carrier substrate 23 can furthermore be arranged on the MEMS printed circuit board 60.

FIG. 3 shows a cross-section of the in-ear headphones 34. The acoustic transducer unit 1, by means of which the sound can be generated, is arranged in the in-ear headphones 34. The in-ear headphones 34 are an exemplary embodiment of the electronic component. The electronic component can also be on-ear headphones, a smartphone, laptop, tablet, smartwatch, etc.

The in-ear headphones 34 shown here as an electronic component comprise a headphone housing 35, in which the acoustic transducer unit 1 is arranged. According to the present exemplary embodiment, the headphone housing 35 is formed in two parts. The headphone housing 35 comprises an ear part 36, which is inserted into the auditory canal of the user when the in-ear headphone 34 is used and operated as intended. An attachment, for example made of silicone, can also be attached over the ear part 36. The attachment forms an earplug, which is then at least partially inserted into the auditory canal. The attachment can be made of a flexible and skin-friendly material. In addition, it is advantageous if this attachment or earplug is adapted such that it can conform to the auditory canal or such that it already conforms to the auditory canal.

The ear part 36 further comprises an outlet opening 43 through which the sound of the electrodynamic and the MEMS acoustic transducer 2, 3 can exit from the ear part 36 or from the headphone housing 35. The outlet opening 43 is advantageously sealed with a sealing element 38 such that the entry of dirt is prevented. The sealing element 38 can for example be a screen, a net, or a foam such that sound can penetrate but dirt is retained.

The headphone housing 35 further comprises a closure part 37 that closes the in-ear headphone 34. This can prevent moisture or water from entering the acoustic transducer unit 1. The closure part 37 can further comprise a wire feedthrough 39 through which the electrical wire, for example from a battery or other electronic components, can be fed to the acoustic transducer unit 1. The wire feedthrough 39 can be omitted if the acoustic transducer unit 1 is supplied with audio signals, etc., for example over a wireless connection. The closure part 37 can thus be closed such that moisture cannot enter. Alternatively, an opening can nevertheless be advantageous in order to create a pressure equalization for the two acoustic transducers 2, 3 while operating the acoustic transducer unit 1.

Furthermore, the ear part 36 comprises an ear part cavity 44. The ear part 36 forms a front volume of the woofer 2 and/or the sound waves of the woofer 2 are guided past through the ear part cavity 44 to the outlet opening. In addition, the closure part 37 comprises a closure part cavity 45, which can form a rear volume of the tweeter 3 and/or the woofer 2.

The ear part 36 further surrounds the transducer housing 4 and/or the outer membrane carrier 13. For example, an adhesive bond can be formed between the transducer housing 4 and/or the outer membrane carrier 13 and the ear part 36 and/or the closure part 37. It is advantageous if the acoustic transducer unit 1 comprises a protective element not shown here, which is arranged around the transducer housing 4 and extends over the first membrane 10 from the outside at least partially in radial direction 22. The first membrane 10 is thus protected, wherein the protective element is spaced at a distance from the first membrane 10 in axial direction. Said adhesive bond can then be present between the protective element and the ear part 36 and/or the closure part 37.

Figure 4:
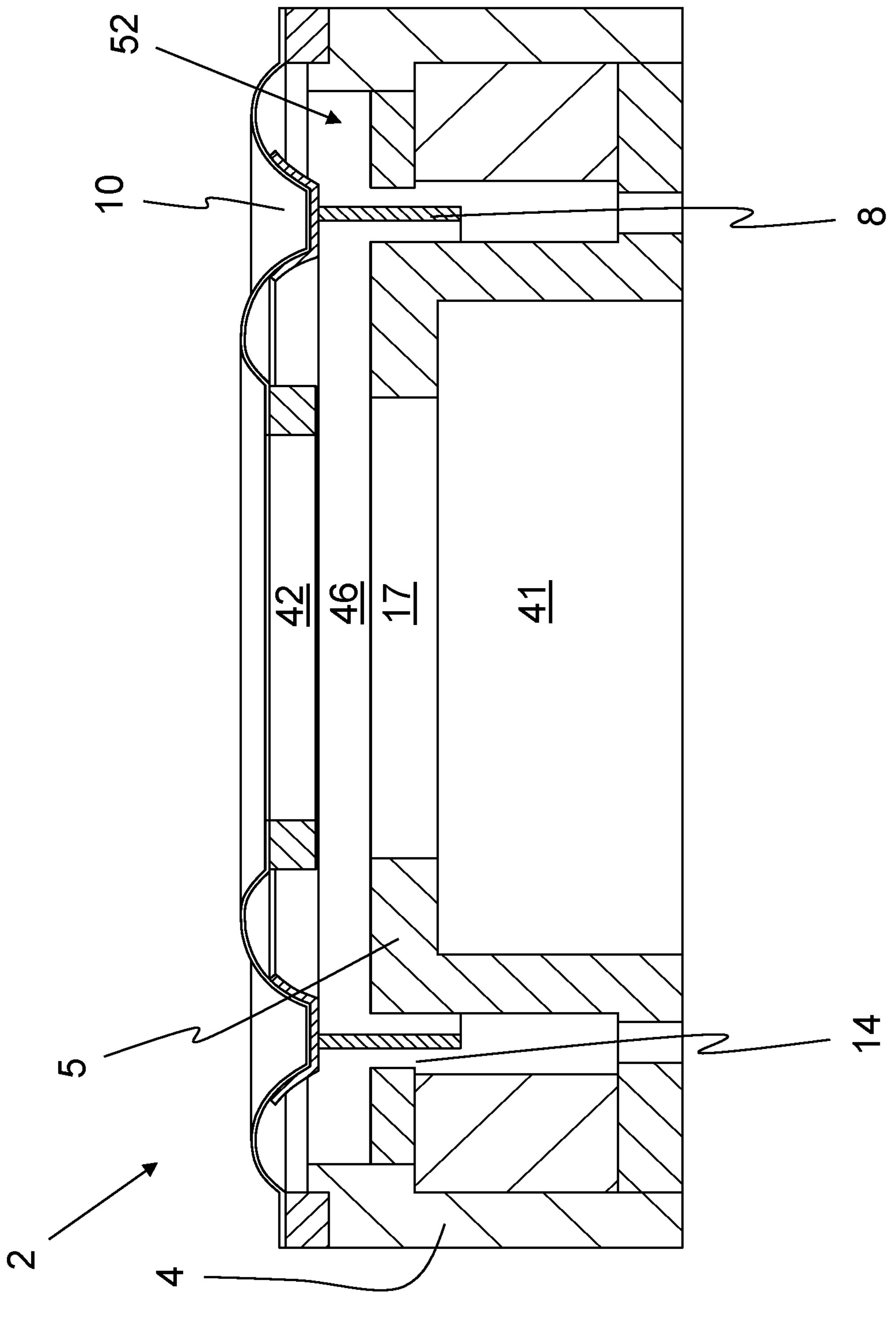

FIG. 4 shows a cross-section of the electrodynamic acoustic transducer 2. For the sake of clarity, the MEMS acoustic transducer 3 is omitted here.

Here, the transducer cavity 41 is shown, which is arranged in the center of the woofer 2. The first pole element 5 extends around the transducer cavity 41 and forms the boundary thereof. The MEMS acoustic transducer 3 is arranged in the converter cavity 41. The sound cavity is furthermore arranged in the first pole element 5, into which the tweeter 3 emits the sound.

The woofer 2 further comprises an oscillation cavity 46, in which the coil 8 and/or the first membrane 10 can oscillate in axial direction 21. Using the oscillation cavity 46, the first membrane 10 can move in the direction of the first pole element 5 and/or in the direction of the tweeter 3 when the first membrane 10 oscillates. In the region of the coil 8, the oscillation cavity 46 transitions into the magnet gap 14.

The membrane perforation 42 is also shown here. Together with the sound cavity 17, the transducer cavity 41 and/or at least partially with the oscillation cavity 46, the membrane perforation 42 forms the opening of the electrodynamic acoustic transducer 2.

FIG. 5 shows a block diagram of at least a part of the electronics unit 18. The electronics unit 18 can comprise an audio source 47, which can comprise a first amplifier 48 for amplifying an audio signal. Additionally or alternatively, the audio source 47 can comprise a Bluetooth chip 49, by which the audio signal can be received. The Bluetooth chip 49 and/or the first amplifier 48 can also be arranged in an external device. For example, the Bluetooth chip 49 and/or the first amplifier 48 can be arranged as an electronic component in a receiver part (not shown here) for the in-ear headphones 34. The in-ear headphones 34 described here receives the audio data from said receiver part, wherein said audio data can already be amplified by means of the first amplifier 48.

The first amplifier 48, the Bluetooth chip 49, or the audio source 47 are followed by a frequency switch 50 that divides the audio signal already amplified by the first amplifier 48 into two signal parts. A first signal part is fed directly to the electrodynamic acoustic transducer 2. In this exemplary embodiment, said first signal part is already amplified by the first amplifier 48. A second signal part, which is for the tweeter 3, is fed to a second amplifier 51. The second amplifier 51 can be provided to amplify the second signal part again because the tweeter 3 requires a voltage level that is up to ten times higher. The tweeter 3 is connected to the second amplifier 51.

Figure 6:
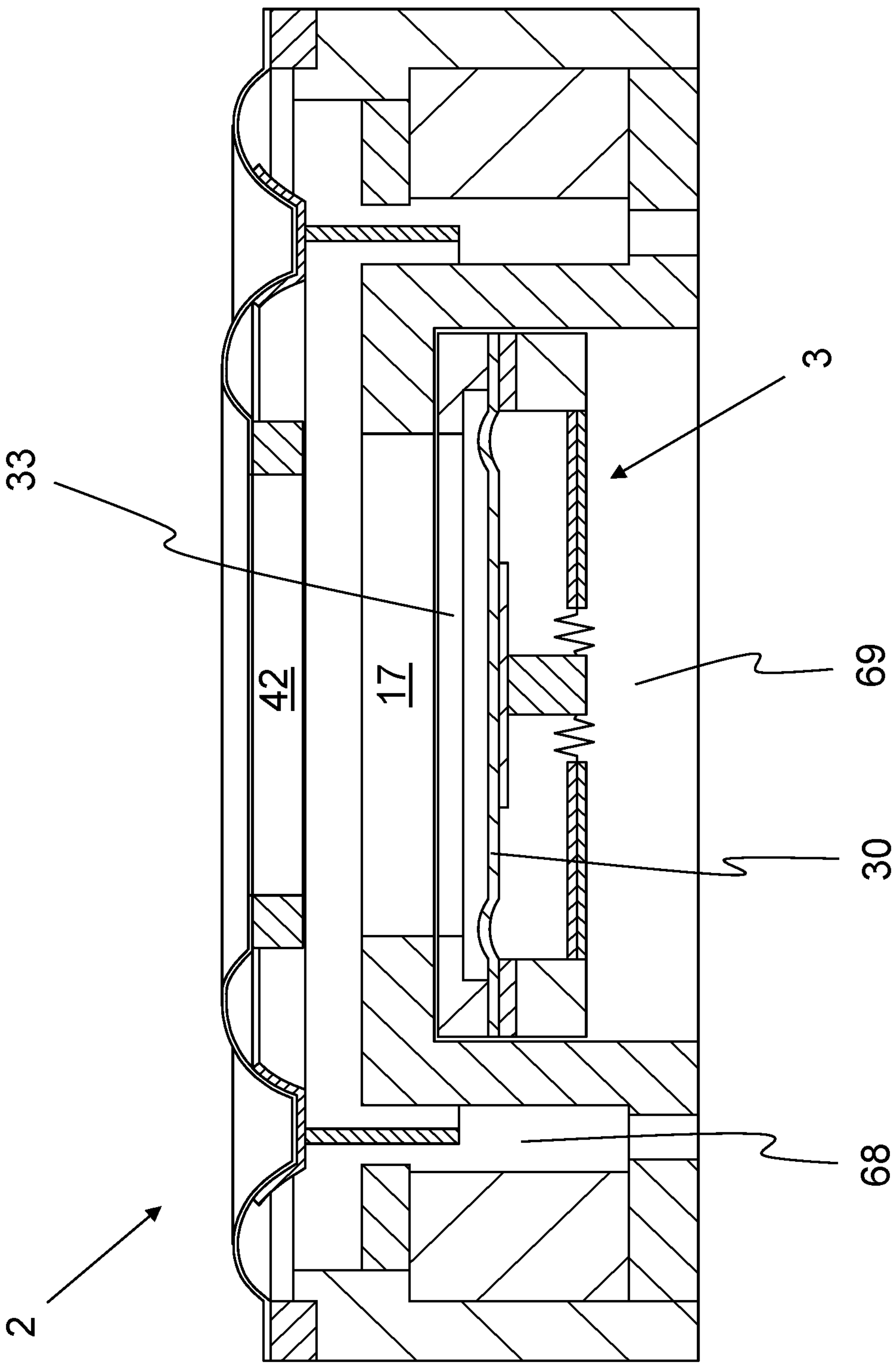

FIG. 6 shows a cross-section of the electrodynamic and the MEMS acoustic transducer 2, 3. For the sake of clarity, most reference symbols are omitted here. The MEMS acoustic transducer 3 is also shown in detail here. The features are described in more detail in FIG. 2. As can be seen here, the second membrane 30 has a surface that is at least as large as a surface of the membrane perforation 42. Here, the surface of the second membrane 30 is larger than the surface of the membrane perforation 42.

Furthermore, the surface of the second membrane 30 is at least as large as a surface of the cover feedthrough 33 and/or the sound cavity 17. Furthermore, as can be seen from FIG. 6 in conjunction with FIG. 1, the surface of the second membrane 30 is at least as large as a cross-sectional surface of the sound cavity 17.

Preferably, the cover feedthrough 33 and the sound cavity 17 in the magnet unit 52, in particular in the first pole element 5, are congruent and/or flush in relation to one another.

Furthermore, a first rear volume 68 of the electrodynamic transducer 2 is shown here. A second rear volume 69 of the MEMS acoustic transducer 3 is also shown here.

Figure 7:
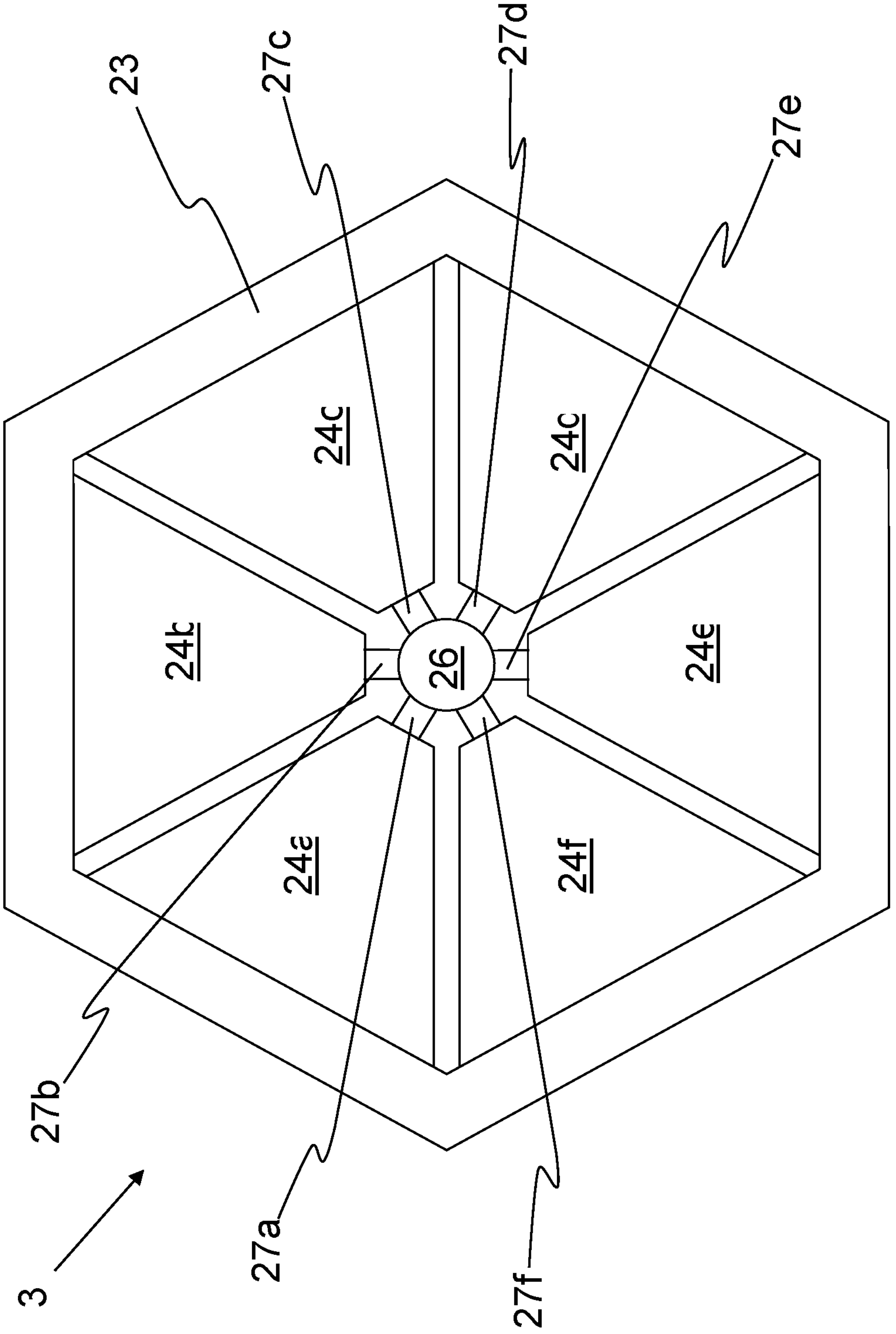

FIG. 7 shows a plan view onto a MEMS acoustic transducer 3. In the present exemplary embodiment, the MEMS acoustic transducer 3 is polygonal. Here, the MEMS acoustic transducer 3 is hexagonal. The MEMS acoustic transducer 3 consequently comprises six carrier layers 24*a*-24*f*. In addition, the MEMS acoustic transducer 3 also comprises six piezo layers 25, which are however concealed here by the carrier layers 24*a*-24*f*. Each of the piezo layers 25 and carrier layers 24*a*-24*f* is connected to the coupling element 26 by means of a spring element 27*a*-27*f*. The MEMS membrane unit 29 with the second membrane 30 is then arranged on the carrier substrate 23 shown here. The MEMS membrane unit 29 and the second membrane 30 have a shape matching the carrier substrate 23. In particular, the MEMS membrane unit 29 and the second membrane 30 are hexagonal, as in this case. Due to the shape shown here, the MEMS acoustic transducer 3 can be adapted to the round transducer cavity 41. The second membrane 30 can be deflected more severely by the multiple carrier and piezo layers 24, 25. This can increase a sound pressure.

Figure 8:
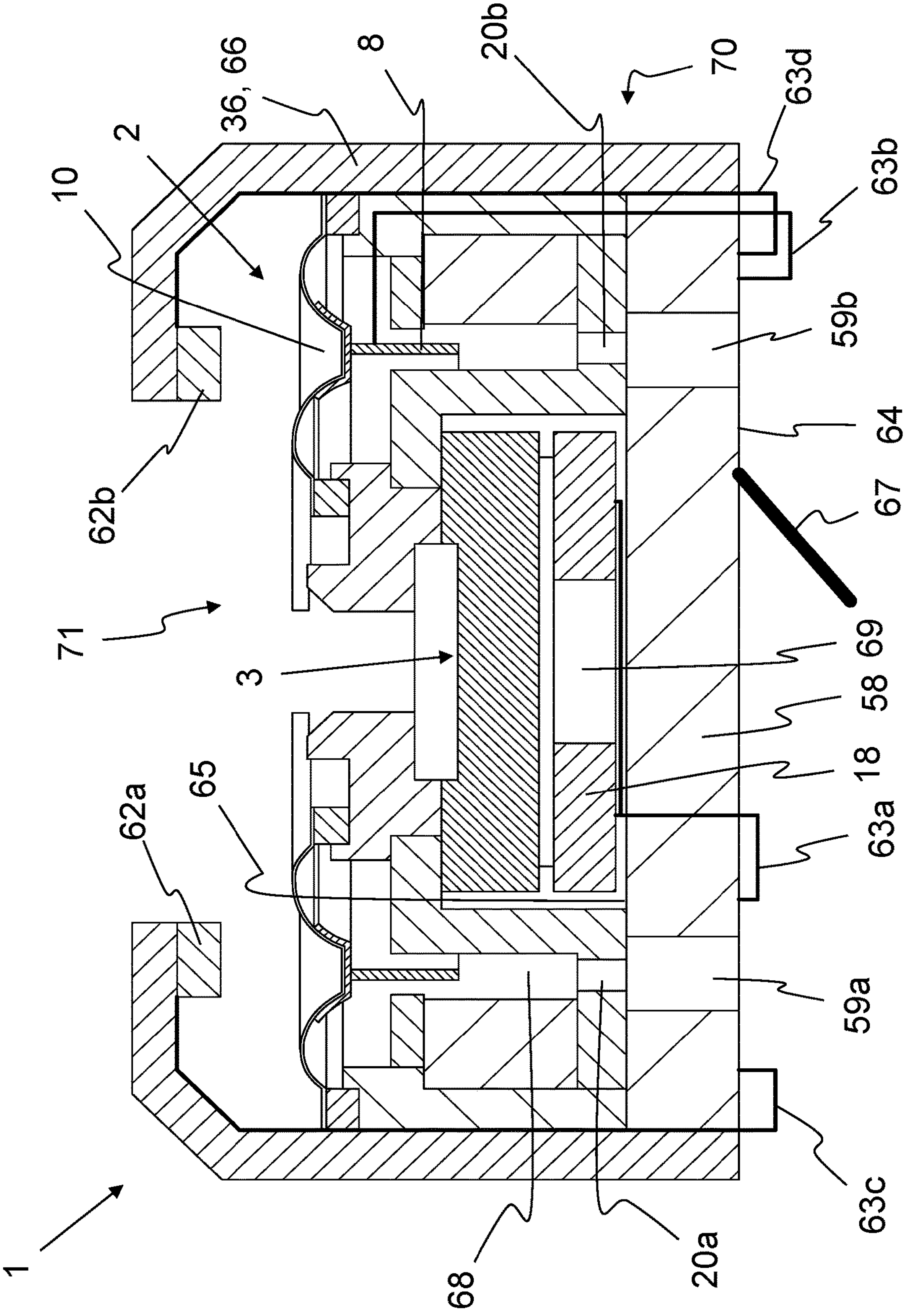

FIG. 8 shows a cross-section of the acoustic transducer unit 1 with a circuit board 58. For the sake of simplicity, only the most important features are provided with a reference symbol. The acoustic transducer unit 1 shown here is described in the preceding figures.

Here, the circuit board 58 is arranged on the side of the acoustic transducer unit 1 facing away from the first and/or second membrane 10, 30. The circuit board 58 is arranged here in the region and/or on a bottom 70 of the acoustic transducer unit 1. The first and/or second membranes 10, 30 are arranged in the region and/or on an upper side 71 of the acoustic transducer unit 1. The printed circuit board 58 comprises at least one circuit board feedthrough 59*a*, 59*b*. With the aid of the circuit board feedthrough 59*a*, 59*b* and/or via the pole feedthroughs 20*a*, 20*b*, the first rear volume 68 of the electrodynamic acoustic transducer 2 can be open and/or left open. As a result, a connection is formed between the first rear volume 68 of the electrodynamic acoustic transducer 2 and an environment of the acoustic transducer unit 1. This can improve the audio quality of the electrodynamic transducer 2. As can be seen in FIG. 8, the pole feedthroughs 20 and the circuit board feedthroughs 59 are at least partially congruent for this purpose. Additionally or alternatively, the at least one pole feedthrough 20 and the circuit board feedthrough 59 can be arranged at an offset in relation to one another when at least one connecting channel not shown here is arranged between the at least one pole feedthrough 20 and the at least one circuit board feedthrough 59. Additionally or alternatively, the printed circuit board 58 can also be smaller in radial direction 22 than shown here. The printed circuit board 58 can be adapted such that the printed circuit board 58 does not reach the pole feedthroughs 20 in radial direction. As a result, the printed circuit board 58 leaves the pole feedthroughs 20 open or does not seal them.

As can further be seen here, the circuit board 58 seals the second rear volume 69 of the MEMS acoustic transducer 3, in particular completely. This prevents the sound waves of the MEMS acoustic transducer 3 from entering the environment in the second rear volume 69.

According to FIG. 8, the acoustic transducer unit 1 comprises the electronics unit 18, the MEMS acoustic transducer 3 and the circuit board 58. The electronics unit 18 described in FIG. 5 can also be arranged in the printed circuit board 58, or the elements of the electronics unit 18 can be arranged in the printed circuit board 58. The electronics unit 18 shown schematically here can then be the MEMS printed circuit board 60 shown in FIG. 2 with the circuit board cavity 61. The electronics feedthrough 19 can then be the circuit board cavity 61. This embodiment of the MEMS printed circuit board 60, the electronics unit 18 and/or the printed circuit board 58 can also be present in the embodiments of the other figures. The acoustic transducer unit 1 can thus comprise the electronics unit 18, the MEMS printed circuit board 60 and/or the printed circuit board 58, wherein the elements of the electronics unit 18 in particular can be arranged in the MEMS printed circuit board 60 and/or in the printed circuit board 58. The electronics unit 18 shown here and the MEMS acoustic transducer 3 can form the MEMS acoustic transducer 3 of FIG. 2, wherein the electronics unit 18 is the MEMS printed circuit board 60.

Furthermore, the acoustic transducer unit 1 shown here comprises at least one microphone 62, wherein two microphones 62*a*, 62*b* are shown here. The at least one microphone 62 is arranged here such that the sound waves emitted by the electrodynamic acoustic transducer 2 reach the at least one microphone 62. In this case, the at least one microphone 62 can face the first membrane 10 such that the sound waves reach the at least one microphone 62 directly. The at least one microphone 62 can be a feedback microphone. The audio quality of the sound waves emitted by the electrodynamic acoustic transducer 2 can be monitored with the at least one microphone 62. Additionally or alternatively, the at least one microphone 62 can also record ambient noise in an environment of the acoustic transducer unit 1 and/or in the environment of the electronics component, for example of the on-ear headphones, smartphone, tablet, laptop, etc. From the detected ambient noise, an anti-sound can be formed, which is generated by the electrodynamic acoustic transducer 2 and/or by the MEMS acoustic transducer 3. This allows the ambient noise to be cancelled. This can be used to implement an active noise canceling method. A further microphone 62 can also be present on the electronic component, for example on the in-ear headphones 34, as shown in FIG. 3. Said microphone 62 can face an environment of the electronic component, for example an environment of the in-ear headphones 34 or an environment of the carrier of the in-ear headphones 34, in order to generate an anti-sound to suppress ambient noise.

The at least one microphone 62 is arranged here on the ear part 36, which is partially shown here. The ear part 36 here is a special embodiment of a housing part 66. The acoustic transducer unit 1 comprises the housing part 66 or is arranged in the housing part 66. The housing part 66 can be part of the electronics component. If the electronics component is the in-ear headphones 34, the housing part 66 is the ear part 36.

Additionally or alternatively, the at least one microphone 62 can also be arranged on an enclosure, in particular a protective enclosure, for the acoustic transducer unit 1, wherein the enclosure serves as protection for the acoustic transducer unit 1 and in particular for the first membrane 10 of the electrodynamic acoustic transducer 2. The housing part 66 and/or the ear part 36 shown here can serve as the enclosure, or the enclosure can be formed by the housing part 66 and/or the ear part 36.

In addition, several wires 63*a*-63*d* are shown schematically in this exemplary embodiment. The wires 63*a*-63*d* can in particular be multi-strand cables or wires 63*a*-63*d*. The electrical signals provided for the operation of the acoustic transducer unit 1 can be distributed with the aid of the wires 63*a*-63*d*. A first wire 63*a* for the electronic unit 18 and/or the MEMS acoustic transducer 3. A second wire 63*b* leads to the coil 8 of the electrodynamic acoustic transducer 2. A third wire 63*c* leads to the first microphone 62*a* shown here, and a fourth wire 63*d* leads to the second microphone 62*b* shown here. The wires 63*a*-63*d* are here coupled to the circuit board 58. As can further be seen here, the wires 63*a*-63*d* are coupled to the circuit board 58 on a rear side 64 of the latter.

The wires 63*a*-63*d* can here be arranged in suitable channels. As can be seen here, the two wires 63*c*, 63*d* are arranged between the transducer housing 4 and the ear part 36 or the housing part 66.

The printed circuit board 58 can further comprise a connection 67 by which electrical signals are conducted from an external unit to the acoustic transducer unit 1. The connector 67 can be adapted as a flexible section, for example as a flex PCB such that the connector 67 can be rotated or bent to facilitate the connection to the connector 67 from different directions. The connection 67 is arranged here on the rear side 64 of the printed circuit board 58. The connection 67 can also comprise a plug and/or can be adapted as a plug. The plug can in this case be a flat plug and/or can be soldered onto the circuit board 58.

Furthermore, the plug can also be arranged on a front side 65 of the printed circuit board 58, in particular as a flat plug. The front side 65 here faces the MEMS acoustic transducer 3 and/or the electronics unit 18. The plug is then passed through the printed circuit board 58, for example through a printed circuit board feedthrough 59.

The flat plug can for example be adapted as a flexible circuit board such that the plug or the flat plug can be arranged flat on the circuit board 58. The plug or the flat plug can thus also be arranged between the printed circuit board 58 and the MEMS acoustic transducer 3 and/or the electronics unit 18, in particular on the front side 65 of the printed circuit board 58. In addition or alternatively, the plug can thus also be coupled to the MEMS acoustic transducer 3 and/or the electronics unit 18.

The present invention is not limited to the illustrated and described exemplary embodiments. Modifications within the scope of the claims are also possible as well as a combination of the features, even if they are shown and described in different exemplary embodiments.

LIST OF REFERENCES

1 Acoustic transducer unit
2 Electrodynamic acoustic transducer/woofer
3 MEMS acoustic transducer/tweeter
4 Transducer housing
5 First pole element
6 Second pole element
7 Magnet
8 Coil
9 Membrane unit
10 First membrane
11 Coupling unit
12 Inner membrane carrier
13 Outer membrane carrier
14 Magnet gap
15 Holder
17 Sound cavity
18 Electronics unit
19 Electronics feedthrough
20 Pole feedthrough
21 Axial direction
22 Radial direction
23 Carrier substrate
24 Carrier layer
25 Piezo layer
26 Coupling element
27 Spring element
28 Coupling plate
29 MEMS membrane unit
30 Second membrane
31 MEMS membrane frame
32 Cover
33 Cover feedthrough
34 In-ear headphones
35 Headphone housing
36 Ear part
37 Closure part
38 Sealing element
39 Wire feedthrough
41 Transducer cavity
42 Membrane perforation
43 Outlet opening
44 Ear part cavity
45 Closure part cavity
46 Oscillation cavity
47 Audio source
48 First amplifier
49 Bluetooth chip
50 Frequency switch
51 Second amplifier
52 Magnet unit
54 MEMS cavity
56 First contact surface
57 Second contact surface
58 Circuit board
59 Circuit board feedthrough
60 MEMS printed circuit board
61 Circuit board cavity
62 Microphone
63 Wire
64 Rear side
65 Front side
66 Housing part
67 Connection
68 First rear volume
69 Second rear volume
70 Bottom
71 Upper side

The invention claimed is:

1. An acoustic transducer unit (1), in particular for in-ear headphones, having an electrodynamic acoustic transducer (2) comprising a first membrane (10), preferably with a membrane perforation (42), and having at least one MEMS acoustic transducer (3) comprising a second membrane (30), characterized in that the acoustic transducer unit (1) comprises a circuit board (58) adapted such that a first rear volume (68) of the electrodynamic acoustic transducer (2) is open, and/or such that said circuit board (58) closes a second rear volume (69) of the MEMS acoustic transducer (3).

2. The acoustic transducer unit according to claim 1, characterized in that the circuit board (58) is arranged on a side of the acoustic transducer unit (1) facing away from the first and/or second membrane.

3. The acoustic transducer unit according to claim 1, characterized in that the circuit board (58) comprises at least one circuit board feed-through (59) such that the first rear volume (68) is open, wherein the at least one circuit board feed-through (59) is preferably arranged in the region of the first rear volume (68).

4. The acoustic transducer unit according to claim 1, characterized in that the circuit board (58) comprises at least one connection (67), wherein the at least one connection (67) is preferably adapted as a flexible connection section and/or as a plug.

5. The acoustic transducer unit according to claim 1, characterized in that the MEMS acoustic transducer (3) is integrated into the electrodynamic acoustic transducer (2) such that the sound waves that can be generated by the second membrane (30) can be emitted from the acoustic transducer unit (1) through the membrane perforation (42).

6. The acoustic transducer unit according to claim 1, characterized in that the electrodynamic acoustic transducer (2) is arranged around the at least one MEMS acoustic transducer (3).

7. The acoustic transducer unit according to claim 1, characterized in that the first membrane (10) is annular.

8. The acoustic transducer unit according to claim 1, characterized in that the electrodynamic acoustic transducer (2) is annular.

9. The acoustic transducer unit according to claim 1, characterized in that the MEMS acoustic transducer (3) is arranged in a through-hole of the torus.

10. The acoustic transducer unit according to claim 8, characterized in that the acoustic transducer unit (1) comprises a transducer cavity (41), in which the MEMS acoustic transducer (3) and/or an electronics unit (18) is arranged, wherein the transducer cavity (41) is preferably formed at least partially by the through-hole of the annular electrodynamic transducer.

11. The acoustic transducer unit according to claim 10, characterized in that the transducer cavity (41) is surrounded by a magnet unit (52), in particular a magnet (7), of the electrodynamic acoustic transducer (2), and/or in that the MEMS acoustic transducer (3) and/or the electronics unit (18) is arranged in axial direction of the transducer unit (1) at the height of the magnet unit (52), in particular of the magnet (7).

12. The acoustic transducer unit according to claim 10, characterized in that the MEMS acoustic transducer (3), the electronics unit (18) and/or a holder (15) in axial direction (21) of the acoustic transducer unit (1) have an overlap region with a magnet unit (52), in particular a magnet (7), of the electrodynamic acoustic transducer (2), a coil (8) of the electrodynamic acoustic transducer (2) and/or a transducer housing (4) of the acoustic transducer unit (1).

13. The acoustic transducer unit according to claim 12, characterized in that the MEMS acoustic transducer (3) is arranged on the holder (15) of the acoustic transducer unit (1) and/or on the magnet unit (52) of the electrodynamic acoustic transducer (2) and/or has a contact surface with these.

14. The acoustic transducer unit according to claim 12, characterized in that the electronics unit (18) comprises an electronics feed-through (19) that adjoins a MEMS cavity (54) of the MEMS acoustic transducer (3).

15. The acoustic transducer unit according to claim 1, characterized in that a sound propagation axis of the electrodynamic acoustic transducer (2) and a sound propagation axis of the MEMS acoustic transducer (3) are coaxially arranged in relation to one another, in particular in axial direction of the acoustic transducer unit (1).

16. The acoustic transducer unit according to claim 1, characterized in that the acoustic transducer unit (1) comprises at least one microphone (62), by means of which at least the sound waves and/or ambient noise that can be generated by the electrodynamic acoustic transducer (2) and/or by the MEMS acoustic transducer (3) can be detected.

17. An electronic component, in particular in-ear headphones (34), having an acoustic transducer unit (1) according to claim 1.

18. An electronic component according to claim 17, characterized in that the electronic component has an outlet opening (43).

19. The use of an acoustic transducer unit (1) according to claim 1 in an electronic component.

* * * * *